United States Patent
Chang et al.

(10) Patent No.: US 9,208,126 B2
(45) Date of Patent: Dec. 8, 2015

(54) COMPUTING DEVICE AND METHOD FOR PROCESSING MEASUREMENT DATA OF OBJECTS

(75) Inventors: Chih-Kuang Chang, New Taipei (TW); Xin-Yuan Wu, Shenzhen (CN); Wei-Quan Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 714 days.

(21) Appl. No.: 13/537,061

(22) Filed: Jun. 29, 2012

(65) Prior Publication Data

US 2013/0041609 A1 Feb. 14, 2013

(30) Foreign Application Priority Data

Aug. 9, 2011 (CN) .......................... 2011 1 0228337

(51) Int. Cl.
 *G06F 17/00* (2006.01)
 *G05B 19/00* (2006.01)
(52) U.S. Cl.
 CPC ............... *G06F 17/00* (2013.01); *G05B 19/00* (2013.01)
(58) Field of Classification Search
 CPC ....................................... G06F 17/00
 USPC ............................................................ 702/85
 See application file for complete search history.

(56) References Cited

U.S. PATENT DOCUMENTS

| 6,917,720 | B1* | 7/2005 | Caesar et al. | 382/287 |
|---|---|---|---|---|
| 8,630,477 | B2* | 1/2014 | Chang et al. | 382/141 |
| 2003/0188445 | A1* | 10/2003 | Kadowaki et al. | 33/10 |

FOREIGN PATENT DOCUMENTS

| TW | I249116 A | 2/2006 |
|---|---|---|
| TW | I286285 A | 9/2007 |

* cited by examiner

*Primary Examiner* — Bryan Bui
(74) *Attorney, Agent, or Firm* — Novak Druce Connolly Bove + Quigg LLP

(57) ABSTRACT

A method processes measurement data of an object using a computing device. The method obtains measurement data of preselected feature elements of a measured object, inserts the measurement data of the preselected feature elements into a data list, obtains measured results of the preselected feature elements from a measurement tool, and calculates tolerance values of the preselected feature elements according to the measured results. The method further searches pixel icons of the preselected feature elements according to tolerance values and the measured results, inserts the pixel icons and the measured results into the data list, receives selections of a user and displays the data list in different list modes.

15 Claims, 11 Drawing Sheets

| NO. | Mea. | Dim. | +Tol | -Tol | Tolerane | Operation |
|-----|--------|--------|------|-------|----------|-----------|
| 01 | 10.001 | -45.50 | 0.20 | -0.20 | ++ | ANGLE |
| 02 | 10.001 | -45.50 | 0.20 | -0.20 | +++ | ANGLE |
| 03 | 10.001 | -45.50 | 0.20 | -0.20 | + | DISTANCE |
| 04 | 10.001 | -45.50 | 0.20 | -0.20 | +++ | DISTANCE |
| 05 | 10.001 | -45.50 | 0.20 | -0.20 | ++ | ANGLE |
| 06 | 10.001 | -45.50 | 0.20 | -0.20 | ++ | LOCATION |

FIG. 1

(Prior Art)

| NO. | Mea. | Dim. | +Tol | -Tol | Toler... | Operatic |
|---|---|---|---|---|---|---|
| | 1 | 12.800 | 0.200 | -0.200 | | |
| | 2 | 11.289 | 0.100 | -0.100 | | |
| | 3 | 0.465 | 0.100 | -0.100 | | |
| | 4 | 0.202 | 0.100 | -0.100 | | |
| | 5 | 24.453 | 0.100 | -0.100 | | |
| | 6 | 3.121 | 0.100 | -0.100 | | |
| | 7 | 2.237 | 0.100 | -0.100 | | |
| | 8 | 1.582 | 0.100 | -0.100 | | |
| | 9 | 1.000 | 0.100 | -0.100 | | |
| | 10 | 0.200 | 0.200 | -0.200 | | |

FIG. 8B

| NO. | Mea. | Dim. | +Tol | -Tol | Toler... | Operation |
|---|---|---|---|---|---|---|
| 7 | | 2.237 | 0.100 | -0.100 | | |
| 8 | | 1.582 | 0.100 | -0.100 | | |
| 9 | | 1.000 | 0.100 | -0.100 | | |
| 11 | | 0.307 | 0.200 | -0.200 | | |
| 12 | | 3.044 | 0.100 | -0.100 | | |
| 10 | | 0.200 | 0.200 | -0.200 | | |
| 13 | | 1.010 | 0.100 | -0.100 | | |
| 14 | | 0.000 | 0.100 | -0.100 | | |
| 15 | | 0.000 | 0.100 | -0.100 | | |
| 16 | | 1.071 | 0.200 | -0.200 | | |

FIG. 9A

| NO. | Mea. | Dim. | +Tol | -Tol | Toler... | Operation |
|---|---|---|---|---|---|---|
| 3 | 0.465 | 0.465 | 0.100 | -0.100 | 0.0 | Distance |

FIG. 9B

| NO. | Mea. | Dim. | +Tol | -Tol | Toler... | Operation |
|---|---|---|---|---|---|---|
| 2 | 11.399 | 11.289 | 0.100 | -0.100 | 118.0 | Angle |
| 4 | 0.101 | 0.202 | 0.100 | -0.100 | 101.0 | Distanc |

FIG. 9C

| NO. | Mea. | Dim. | +Tol | -Tol | Toler... | Operation |
|---|---|---|---|---|---|---|
| 1 | 12.974 | 12.800 | 0.200 | -0.200 | 87.0 | Angle |
| 5 | 24.373 | 24.453 | 0.100 | -0.100 | 88.0 | Angle |
| 6 | 3.044 | 3.121 | 0.100 | -0.100 | 77.0 | Locatio |

FIG. 9D

| NO. | Mea. | Dim. | +Tol | -Tol | Toler... | Operatic |
|---|---|---|---|---|---|---|
| 1 | 12.974 | 12.800 | 0.200 | -0.200 | 87.0 | Angle |
| 2 | 11.399 | 11.289 | 0.100 | -0.100 | 110.0 | Angle |
| 3 | 0.465 | 0.465 | 0.100 | -0.100 | 0.0 | Distanc |
| 4 | 0.101 | 0.202 | 0.100 | -0.100 | 101.0 | Distanc |
| 5 | 24.373 | 24.453 | 0.100 | -0.100 | 80.0 | Angle |
| 6 | 3.044 | 3.121 | 0.100 | -0.100 | 77.0 | Locatio |
| 7 | 2.237 | 2.237 | 0.100 | -0.100 | 0.0 | Locatio |
| 8 | 1.582 | 1.582 | 0.100 | -0.100 | 0.0 | Locatio |
| 9 | 1.000 | 1.000 | 0.100 | -0.100 | 0.0 | Locatio |
| 10 | 0.200 | 0.200 | 0.200 | -0.200 | 0.0 | Distanc |

FIG. 11A

| NO. | Mea. | Dim. | +Tol | -Tol | Toler... | Operatic |
|---|---|---|---|---|---|---|
| 16 | 1.071 | 1.071 | 0.200 | -0.200 | 0.0 | Distanc |
| 15 | 0.000 | 0.000 | 0.100 | -0.100 | 0.0 | Symmet |
| 14 | 0.000 | 0.000 | 0.100 | -0.100 | 0.0 | Paralleli |
| 13 | 1.526 | 1.610 | 0.100 | -0.100 | 84.0 | Locatio |
| 12 | 3.044 | 3.044 | 0.100 | -0.100 | 0.0 | Locatio |
| 11 | 0.307 | 0.307 | 0.200 | -0.200 | 0.0 | Distanc |
| 10 | 0.200 | 0.200 | 0.200 | -0.200 | 0.0 | Distanc |
| 9 | 1.000 | 1.000 | 0.100 | -0.100 | 0.0 | Locatio |
| 8 | 1.582 | 1.582 | 0.100 | -0.100 | 0.0 | Locatio |
| 7 | 2.237 | 2.237 | 0.100 | -0.100 | 0.0 | Locatio |

FIG. 11B

COMPUTING DEVICE AND METHOD FOR PROCESSING MEASUREMENT DATA OF OBJECTS

BACKGROUND

1. Technical Field

Embodiments of the present disclosure relate to data measurement systems and methods, and particularly to a computing device and method for processing measurement data of an object using the computing device.

2. Description of Related Art

Measurement is an important phase in manufacturing and is closely related to product quality. In recent years, point cloud obtaining devices have been used to obtain a point cloud of an object by scanning a large number of points on a surface of the object, processing the data in the point cloud, and subsequently extracting boundary elements including boundary points and boundary characteristics of the object, in order to form an image of the profile of the object. As shown in FIG. 1, however, the current measuring method merely outputs measured results (e.g., tolerances of objects) using a data report (e.g., an EXCEL file). It is inconvenient for a user to check the measured results in the data report manually. Therefore, a more efficient method for outputting measured results is desired.

BRIEF DESCRIPTION OF THE DRAWINGS

FIG. 1 is a schematic diagram illustrating measurement data of feature elements of an object in text form.

FIG. 8A illustrates initial measurement data of preselected feature elements.

FIG. 8B illustrates a data list of the initial measurement data of the preselected feature elements.

FIGS. 9A-9D illustrate the data lists corresponding to different filter selections of the measurement data of the feature elements.

FIG. 11A and FIG. 11B illustrate the data lists corresponding to different column selections of the measurement data of the feature elements.

DETAILED DESCRIPTION

All of the processes described below may be embodied in, and fully automated via, functional code modules executed by one or more general purpose computing devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 2:
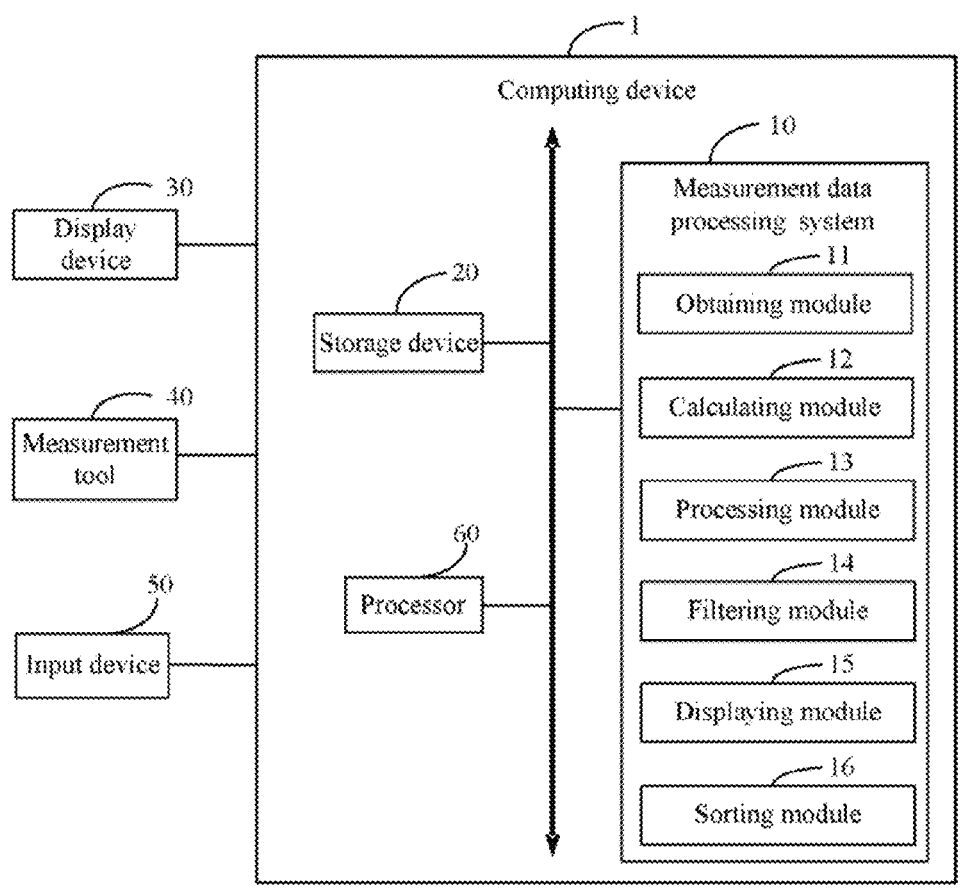
FIG. 2 is a block diagram of one embodiment of a computing device including a measurement data processing system.

FIG. 2 is a block diagram of one embodiment of a computing device 1 including a measurement data processing system 10. In the embodiment, the computing device 1 further includes a storage device 20, a display device 30, a measurement tool 40, an input device 50, and at least one processor 60. The computing device 1 may be a computer, a server, or any other computing device. The measurement data processing system 10 may be used to automatically obtain measurement data of feature elements of an object that is measured (hereinafter "measured object"), and output the results of measurements (hereinafter "measured results") relating to all the feature elements in different list modes on the display device 30. The list mode is a mode that displays a data list stored in the storage device 20. In one embodiment, the measurement data may include an ordinal number of the feature element which is measured, a standard dimension, and a tolerance range, but the disclosure is not limited thereto. In one embodiment, each "feature element" may be a line, a plane, a circle, a cylinder, or a sphere, but the disclosure is not limited thereto.

The storage device 20 may store the measurement data of the measured object. The display device 30 displays the measurement data and the measured results of the feature elements of the measured object. The measurement tool 40 may be an image measuring machine to measure the measured object. The measure tool 40 obtains the measurement data of the measured object from the storage device 20, and measures the measured object to obtain measured results corresponding to the measurement data. The input device 50 may be a mouse or a keyboard used to input computer readable data.

In one embodiment, the measurement data processing system 10 may include one or more modules, for example, an obtaining module 11, a calculating module 12, a processing module 13, a filtering module 14, a display module 15 and a sorting module 16. The one or more modules 11-16 may comprise computerized code in the form of one or more programs that are stored in the storage device 20 or memory of the computing device 1. The computerized code includes instructions that are executed by the at least one processor 60 to provide functions for the one or more modules 11-16. A detailed description of each module will be given in the following paragraphs.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
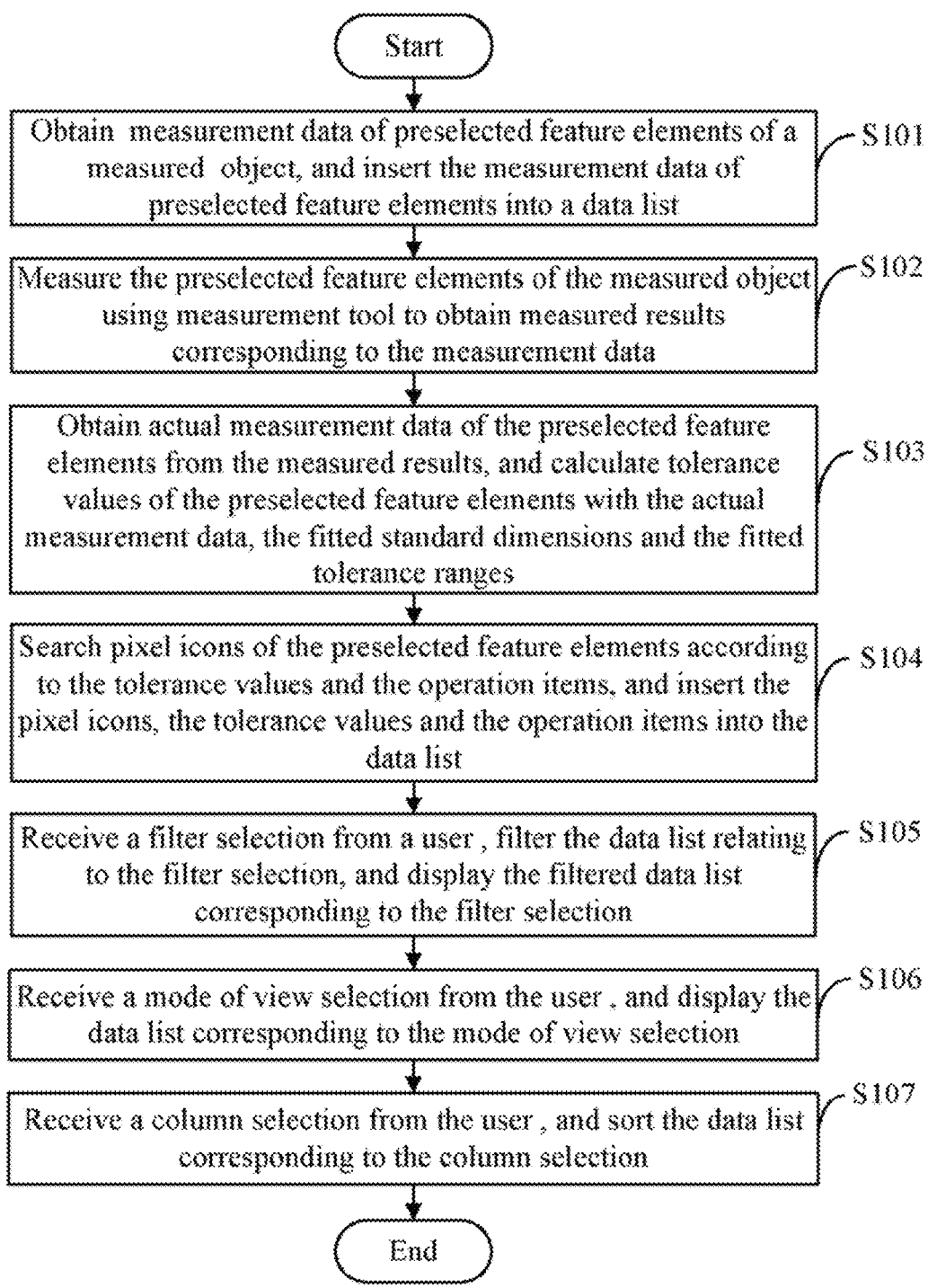
FIG. 3 is a flowchart of one embodiment of a method for automatically processing measurement data of an object using the computing device of the FIG. 2.

FIG. 3 is a flowchart of one embodiment of a method for automatically processing measurement data of an object using the computing device 1. Depending on the embodiment, additional steps may be added, others removed, and the ordering of the steps may be changed.

In step S101, the obtaining module 11 obtains the measurement data of preselected feature elements of the measured object to be measured from the storage device 20, and inserts the measurement data of the preselected feature elements into the data list. A detailed description of step S101 will be given in FIG. 4. In one embodiment, the preselected feature elements may be user-determined or pre-determined.

In one embodiment, the measurement data may include, but is not limited to, an ordinal number, a standard dimension of the feature element, and a tolerance range. The feature element includes the preselected feature element to be measured and the measured feature element has been measured. The ordinal number is used to label the measurement data of the feature element. The standard dimension is used as a reference of the measured result of the corresponding feature element. The tolerance range may be a preset number range, for example, [−0.1, +0.1].

In step S102, the measurement tool 40 obtains the measurement data of the preselected feature elements of the measured object from the storage device 20, and measures the measured object to obtain measured results corresponding to the measurement data. In one embodiment, the measured result may be a code, for example, "(1=DIMENSION/ANGLE, A0, LN1, LN2, 12.974, 12.800, 0.2000, −0.2000)". The measured result may include, but is not limited to, an actual measurement data, an operation item. For example, the actual measurement data is a true value of the preselected feature element as measured, for example, it may be the length of the preselected feature element along an X-axis or on a Y-axis. The operation item of the preselected feature element may include, but is not limited to, a distance or an angle between two adjacent preselected feature elements, a distance from the preselected feature element to the X-axis, or a distance from the preselected feature element to the Y-axis.

In one embodiment, the data list includes the measurement data and the measured results. Each row of the data list stores a feature element, and the column of the data list may store the ordinal number with the pixel icon, the standard dimension, the minimum and maximum of the tolerance range, the actual measurement data, and the operation item. The pixel icon is an icon stored in the storage device 20 with a color and an image.

In step S103, the calculating module 12 obtains the measured results of the preselected feature elements from the measurement tool 40, and further obtains actual measurement data of the preselected feature elements from the measured results, then calculates tolerance values of the preselected feature elements with the actual measurement data, the fitted standard dimensions and the fitted tolerance ranges. A detailed description of step S103 will be given in FIG. 5.

In step S104, the processing module 13 searches pixel icons of the preselected feature elements in the storage device 20 according to the tolerance values and the operation items, and inserts the pixel icons, the tolerance values and the operation items into the data list. A detailed description of step S104 will be given in FIG. 6.

In one embodiment, if the tolerance value falls in a first sub-range (e.g. 0%-70%), the color of the pixel icon may be green representing that the feature element is a normal and regular feature element. If the tolerance value falls in a second sub-range (e.g. 70%-100%), the color of the pixel icon may be yellow representing that the feature element is an irregular feature element. If the tolerance value falls in a third sub-range (e.g. equal to or greater than 100%), the color of the pixel icon may be red representing that the feature element is a critically abnormal feature element. The regular feature element, the irregular feature element, and the critically abnormal feature element belong to the measured feature elements.

In step S105, the filtering module 14 receives a filter selection from a user, filters the data list according to the filter selection, and displays the filtered data list on the display device 30. A detailed description of step S105 will be given in FIG. 7.

In one embodiment, the filter selection may include a regular selection, an irregular selection, a critically abnormal selection. The regular selection selects the regular feature elements. The irregular selection selects the irregular feature elements. The critically abnormal selection selects the critically abnormal feature elements.

In step S106, the displaying module 15 receives a mode of view selection from the user, and displays the data list corresponding to the mode of view selection on the display device 30. In one embodiment, the mode of view selection includes a selection of an icon style and a selection of a list style.

Figures 10A, 10B:
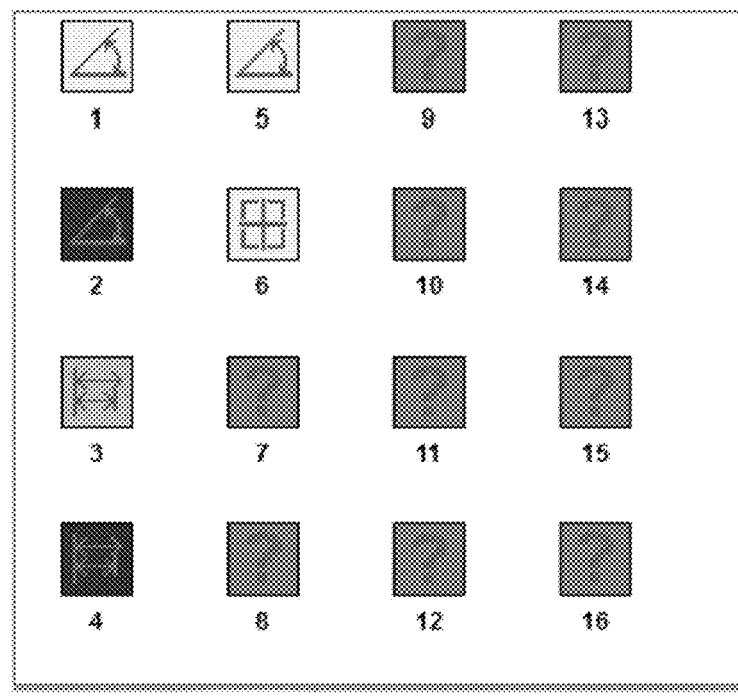
FIG. 10A and FIG. 10B illustrate the data lists corresponding to different view selections of the measurement data of the feature elements.

In one embodiment, the data list in the icon style is shown in FIG. 10B. The data list in the icon style only displays the column of the ordinal numbers, and hides other columns and the header. The data list in the list style is shown in FIG. 10A. The data list in the list style displays all columns of the feature elements. In FIG. 10A and FIG. 10B, the pixel icons with the ordinal numbers 1, 5, 6 are yellow, and the pixel icon with the ordinal number 3 is green, and the pixel icons with the ordinal numbers 2, 4 are red, and the pixel icons with the ordinal numbers 7, 8, 9, 10 are gray.

In step S107, the sorting module 16 receives a column selection from the user, and sorts the data list corresponding to the column selection on the display device 30. In one embodiment, the column selection may select each column of the data list. Referring to FIG. 11A, the data list is sorted by the column selection in a sequence from smallest to largest. As shown in FIG. 11A, the pixel icons with the ordinal numbers 1, 5, 6 are yellow, the pixel icons with the ordinal numbers 2, 4 are red, and the other pixel icons are green. Referring to FIG. 11B, the data list is also sorted by the ordinal number in a sequence from largest to smallest. As shown in FIG. 11B, the pixel icon with the ordinal number 13 is yellow, and the other pixel icons are green.

Figure 4:
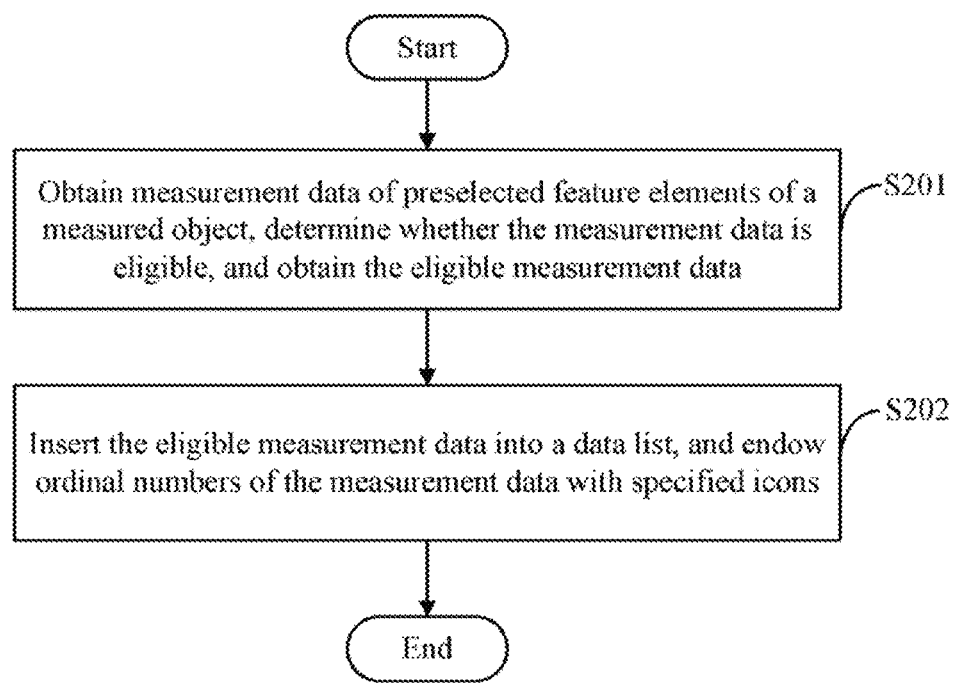
FIG. 4 is a detailed flowchart of step S101 in FIG. 3.

FIG. 4 is a detailed flowchart of step S101 in FIG. 3. Depending on the embodiment, additional steps may be added, others removed, and the ordering of the steps may be changed.

Figures 8A, 8B:
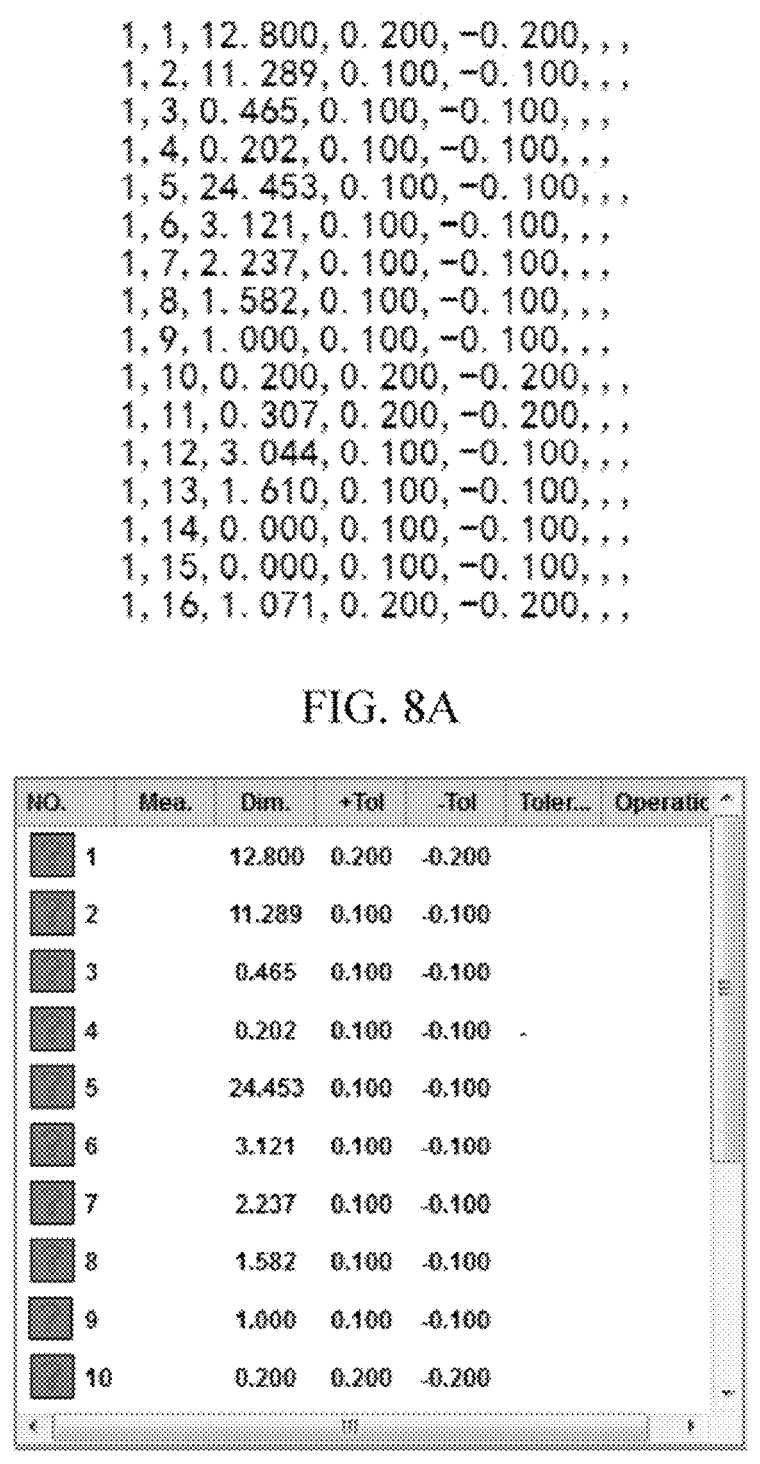

In step S201, the obtaining module 11 obtains the measurement data of the preselected feature elements of the measured object from the storage device 20, determines whether the measurement data is eligible, and obtains the eligible measurement data. In one embodiment, the measurement data of each preselected feature element is in a row form. If the measurement data contains seven commas, the obtaining module 11 determines that the measurement data of the row is eligible. As shown in FIG. 8A, the measurement data has seven commas, thus the measurement data is eligible.

In step S202, the obtaining module 201 inserts the eligible measurement data into the data list, and endows the ordinal numbers of the measurement data with specified icons. The specified icon indicates the measurement data of the preselected feature element to be measured. In one embodiment, the specified icon may be a gray icon containing a "?" character. The data list inserted with the eligible measurement data is shown in FIG. 8B. For example, the second row "1, 2, 11.289, 0.100, −0.100, . . . ," of FIG. 8A is inserted into the data list in FIG. 8B, and the data list has the measurement data of the second row. In the second row "1, 2, 11.289, 0.100, −0.100, . . . ,", "1" represents a preselected feature element, "2" represents the ordinal number, "11.289" represents the standard dimension for the preselected feature element, and "0.100, −0.100" represents the tolerance range. The icon "?" is gray in FIG. 8B.

Figure 5:
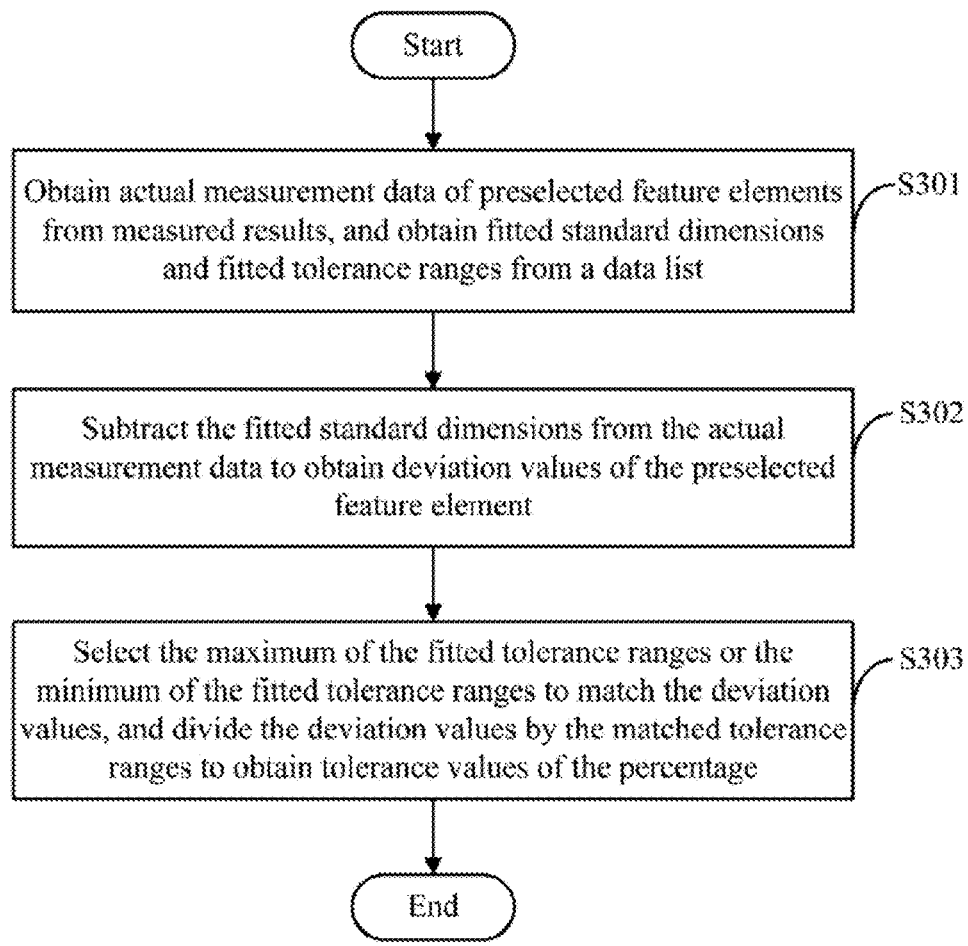
FIG. 5 is a detailed flowchart of step S103 in FIG. 3.

FIG. 5 is a detailed flowchart of step S103 in FIG. 3. Depending on the embodiment, additional steps may be added, others removed, and the ordering of the steps may be changed.

In step S301, the calculating module 12 obtains actual measurement data of the preselected feature elements from the measured results, and obtains the fitted standard dimensions and the fitted tolerance ranges from the data list. For example, the measured result is "(1=DIMENSION/ANGLE, A0, LN1, LN2, 12.974, 12.800, 0.2000, −0.2000)", then the calculating module 12 obtains the actual measurement data as "12.974", and the fitted standard dimension as "12.800", and the fitted tolerance range as "0.2000, −0.2000".

In step S302, the calculating module 12 subtracts the fitted standard dimensions from the actual measurement data to obtain a deviation value of each of the preselected feature elements. For example, the calculating module 12 subtracts the fitted standard dimension "12.800" from the actual measurement data "12.974", and then obtains the deviation value "0.174".

In step S303, the calculating module 12 selects the maximum of the fitted tolerance ranges or the minimum of the fitted tolerance ranges to match the deviation values, and divides the deviation values by the matched tolerance ranges to obtain tolerance values of the percentage. If the deviation value is a positive number, the deviation value matches the maximum of the fitted tolerance range. If the deviation value is a negative number, the deviation value matches the minimum of the fitted tolerance range. For example, the deviation value "0.174" matches the maximum of the fitted tolerance range "0.2000", and the deviation value "0.174" divided by the fitted tolerance range "0.2000" equals the tolerance value 87%.

Figure 6:
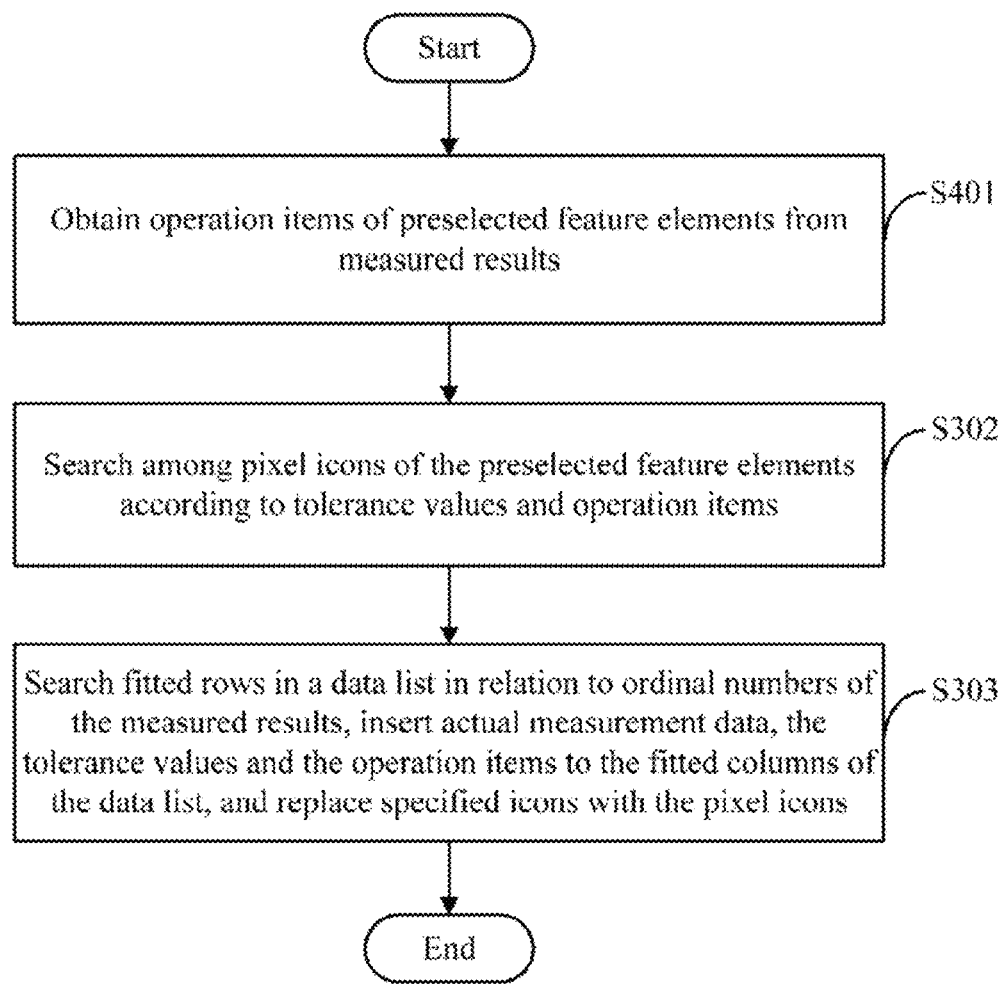
FIG. 6 is a detailed flowchart of step S104 in FIG. 3.

FIG. 6 is a detailed flowchart of step S104 in FIG. 3. Depending on the embodiment, additional steps may be added, others removed, and the ordering of the steps may be changed.

In step S401, the processing module 13 obtains operation items of the preselected feature elements from the measured results. As shown in the measured result of the preselected feature elements above "1=DIMENSION/ANGLE", the operation item is an angle.

In step S402, the processing module 13 searches among the pixel icons of the preselected feature elements in the storage device 20 according to the tolerance values and the operation items. The color of the pixel icon is different according to the tolerance value, and the image of the pixel icon is different according to the operation item. For example, a search for the tolerance value "87%" and the operation item "angle" reveals a yellow "angle" icon (e.g. the pixel icon with the ordinal numbers 1 in FIG. 10B).

In step S403, the processing module 13 searches the fitted rows in the data list in relation to the ordinal numbers of the measured results, inserts the actual measurement data, the tolerance values and the operation items to the fitted columns of the data list, and replaces the specified icons with the pixel icons. As shown in FIG. 10A, the rows with the ordinal numbers 1, 2, 3, 4, 5, 6 are the measured feature elements, and the rows with the ordinal numbers 7, 8, 9, 10 are the preselected feature elements.

Figure 7:
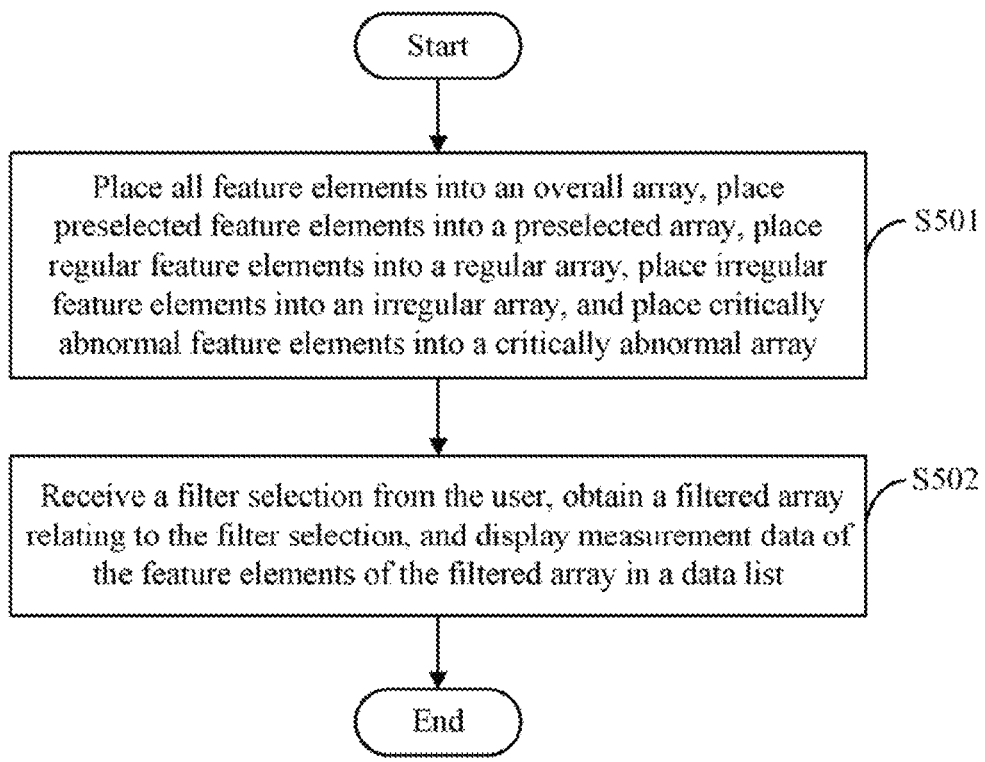
FIG. 7 is a detailed flowchart of step S105 in FIG. 3.

FIG. 7 is a detailed flowchart of step S105 in FIG. 3. Depending on the embodiment, additional steps may be added, others removed, and the ordering of the steps may be changed.

In step S501, the filtering module 14 places all the feature elements into an overall array, places the preselected feature elements into a preselected array, places the regular feature elements into a regular array, places the irregular feature elements into an irregular array, and places the critically abnormal feature elements into a critically abnormal array.

In step S502, the filtering module 14 receives a filter selection from the user, obtains a filtered array relating to the filter selection, and displays the measurement data of the feature elements of the filtered array in the data list. The filter selection is a selection that the user can select which feature elements of the array to be filtered from the data list. As shown in FIG. 10A, the data list displays the measurement data of all the feature elements of the overall array. As shown in FIG. 9A, the data list displays the measurement data of the preselected feature elements of the preselected array, and the icons in the data list are gray. As shown in FIG. 9B, the data list displays the measurement data of the regular feature elements of the regular array, and the icons in the data list are green. As shown in FIG. 9C, the data list displays the measurement data of the irregular feature elements of the irregular array, and the icons in the data list are yellow. As shown in FIG. 9D, the data list displays the measurement data of the critically abnormal feature elements of the critically abnormal array, and the icons in the data list are red.

Prior to this disclosure, the measurement data of the feature elements is only displayed in text form, as shown in FIG. 1. The text form is not convenient to view by user, and can not apply contrasts and adjust the measurement data in the manner of the disclosure. By this disclosure, the measurement data of the feature elements is displayed in different list modes. The measurement data in different list modes present options to the user and allow the user to manage data in different ways.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A computerized-implemented method of a computing device for processing measurement data of objects, the method comprising:

(a) obtaining measurement data of preselected feature elements of a measured object from a storage device of the computing device, and inserting the measurement data of the preselected feature elements into a data list stored in the storage device, wherein the measurement data comprises standard dimensions of the preselected feature elements and tolerance ranges of the preselected feature elements;

(b) obtaining measured results of the preselected feature elements from a measurement tool of the computing device, obtaining actual measurement data of the preselected feature elements from the measured results, obtaining the standard dimensions and the tolerance ranges from the data list, and calculating tolerance values of the preselected feature elements according to the actual measurement data, the standard dimensions and the tolerance ranges, wherein the tolerance values are calculated by obtaining deviation values by subtracting the standard dimensions from the actual measurement data, by selecting the maximum of the tolerance ranges or the minimum of the tolerance ranges to match the deviation values, and by dividing the deviation values by the matched tolerance ranges to obtain tolerance values of the percentage; and (c) obtaining operation items of the preselected feature elements from the measured results, searching pixel icons of the preselected feature elements in the storage device according to the tolerance values and the operation items, and inserting the pixel icons, the tolerance values and the operation items into the data list.

2. The method according to claim 1, further comprising:
placing all feature elements into an overall array, placing the preselected feature elements into a preselected array, placing regular feature elements into a regular array, placing irregular feature elements into an irregular array, and placing critically abnormal feature elements into a critically abnormal array; and
receiving a filter selection from a user, obtaining a corresponding array relating to the filter selection, and displaying the measurement data of the feature elements of the corresponding array in the data list.

3. The method according to claim 1, further comprising:
receiving a mode of view selection from the user, and displaying the data list corresponding to the mode of view selection on a display device.

4. The method according to claim 1, further comprising:
receiving a column selection from the user, and sorting the data list corresponding to the column selection on a display device.

5. The method according to claim 1, wherein the step (a) further comprises:
obtaining the measurement data of the preselected feature elements of the measured object from the storage device, determining whether the measurement data is eligible, and obtaining the eligible measurement data;
inserting the eligible measurement data into the data list; and
endowing the ordinal numbers of the measurement data with specified icons.

6. A computing device, comprising:
a storage device;
at least one processor; and
one or more modules that are stored in the storage device and are executed by the at least one processor, the one or more modules comprising:
an obtaining module that obtains measurement data of preselected feature elements of a measured object from the storage device, and inserts the measurement data of the preselected feature elements into a data list stored in the storage device, wherein the measurement data comprises standard dimensions of the preselected feature elements and tolerance ranges of the preselected feature elements;
a calculating module that obtains measured results of the preselected feature elements from a measurement tool of the computing device, obtains actual measurement data of the preselected feature elements from the measured results, obtains the standard dimensions and the tolerance ranges from the data list, and calculates tolerance values of the preselected feature elements according to the actual measurement data, the standard dimensions and the tolerance ranges, wherein the tolerance values are calculated by obtaining deviation values by subtracting the standard dimensions from the actual measurement data, by selecting the maximum of the tolerance ranges or the minimum of the tolerance ranges to match the deviation values, and by dividing the deviation values by the matched tolerance ranges to obtain tolerance values of the percentage; and
a processing module that obtains operation items of the preselected feature elements from the measured results, searches pixel icons of the preselected feature elements in the storage device according to the tolerance values and the operation items, and inserts the pixel icons, the tolerance values and the operation items into the data list.

7. The computing device according to claim 6, further comprising:
a filtering module that places all feature elements into an overall array, places the preselected feature elements into a preselected array, places regular feature elements into a regular array, places irregular feature elements into an irregular array, places critically abnormal feature elements into a critically abnormal array, receives a filter selection from a user, obtains a corresponding array relating to the filter selection, and displays the measurement data of the feature elements of the corresponding array in the data list.

8. The computing device according to claim 6, further comprising:
a displaying module that receives a mode of view selection from the user, and displays the data list corresponding to the mode of view selection on a display device.

9. The computing device according to claim 6, further comprising:
a sorting module that receives a column selection from the user, and sorts the data list corresponding to the column selection on a display device.

10. The computing device according to claim 6, wherein the obtaining module further obtains the measurement data of the preselected feature elements of the measured object from the storage device, determines whether the measurement data is eligible, obtains the eligible measurement data, inserts the eligible measurement data into the data list, and endows the ordinal numbers of the measurement data with specified icons.

11. A non-transitory storage medium having stored thereon instructions that, when executed by a processor of a computing device, causes the computing device to perform a method for processing measurement data of objects, the method comprising:
(a) obtaining measurement data of preselected feature elements of a measured object from a storage device of the computing device, and inserting the measurement data of the preselected feature elements into a data list stored in the storage device, wherein the measurement data comprises standard dimensions of the preselected feature elements and tolerance ranges of the preselected feature elements;
(b) obtaining measured results of the preselected feature elements from a measurement tool of the computing device, obtaining actual measurement data of the preselected feature elements from the measured results, obtaining the standard dimensions and the tolerance ranges from the data list, and calculating tolerance values of the preselected feature elements according to the actual measurement data, the standard dimensions and the tolerance ranges, wherein the tolerance values are calculated by obtaining deviation values by subtracting the standard dimensions from the actual measurement data, by selecting the maximum of the tolerance ranges or the minimum of the tolerance ranges to match the deviation values, and by dividing the deviation values by the matched tolerance ranges to obtain tolerance values of the percentage; and
(c) obtaining operation items of the preselected feature elements from the measured results, searching pixel icons of the preselected feature elements in the storage device according to the tolerance values and the operation items, and inserting the pixel icons, the tolerance values and the operation items into the data list.

12. The non-transitory storage medium according to claim 11, wherein the method further comprises:

placing all feature elements into an overall array, placing the preselected feature elements into a preselected array, placing regular feature elements into a regular array, placing irregular feature elements into an irregular array, and placing critically abnormal feature elements into a critically abnormal array; and receiving a filter selection from a user, obtaining a corresponding array relating to the filter selection, and displaying the measurement data of the feature elements of the corresponding array in the data list.

13. The non-transitory storage medium according to claim 11, wherein the method further comprises:

receiving a mode of view selection from the user, and displaying the data list corresponding to the mode of view selection on a display device.

14. The non-transitory storage medium according to claim 11, wherein the method further comprises:

receiving a column selection from the user, and sorting the data list corresponding to the column selection on a display device.

15. The non-transitory storage medium according to claim 11, wherein the step (a) further comprises:

obtaining the measurement data of the preselected feature elements of the measured object from the storage device, determining whether the measurement data is eligible, and obtaining the eligible measurement data;

inserting the eligible measurement data into the data list; and endowing the ordinal numbers of the measurement data with specified icons.

\* \* \* \* \*